(12) United States Patent
Boom et al.

(10) Patent No.: US 9,975,420 B2
(45) Date of Patent: May 22, 2018

(54) ADJUSTMENT DEVICE WITH DRIVE UNIT; AIR INLET WITH SUCH AN ADJUSTMENT DEVICE; MOTOR VEHICLE WITH SUCH AN AIR INLET

(75) Inventors: Stephen Alexander George Gustavo Boom, Woerden (NL); Erik Alfred Simeon de Vries, Woerden (NL); Stefan Frits Brouwer, Woerden (NL)

(73) Assignee: MCi (Mirror Controls International) Netherlands B.V., Woerden (NL)

( * ) Notice: Subject to any disclaimer, the term of this patent is extended or adjusted under 35 U.S.C. 154(b) by 785 days.

(21) Appl. No.: 14/233,647

(22) PCT Filed: Jul. 20, 2012

(86) PCT No.: PCT/NL2012/050524
§ 371 (c)(1),
(2), (4) Date: Mar. 28, 2014

(87) PCT Pub. No.: WO2013/012337
PCT Pub. Date: Jan. 24, 2013

(65) Prior Publication Data
US 2014/0342655 A1    Nov. 20, 2014

(30) Foreign Application Priority Data

Jul. 21, 2011    (NL) ...................................... 2007162

(51) Int. Cl.
*B60K 11/08*    (2006.01)

(52) U.S. Cl.
CPC ............ *B60K 11/085* (2013.01); *B60K 11/08* (2013.01); *Y02T 10/88* (2013.01)

(58) Field of Classification Search
CPC ... F16H 2019/085; F16H 19/08; B60K 11/08; B60K 11/085
See application file for complete search history.

(56) References Cited

U.S. PATENT DOCUMENTS

| 1,393,161 A | 10/1921 | Raleigh |
| 2,752,111 A | 6/1956 | Schairer |
| 4,926,921 A | 5/1990 | Heinemann |
(Continued)

FOREIGN PATENT DOCUMENTS

| CN | 2138054 Y | 7/1993 |
| CN | 101462557 A | 6/2009 |
(Continued)

OTHER PUBLICATIONS

International Search Report from PCT/NL2013/050414 (WO 2013/187760), dated Jul. 17, 2013.
(Continued)

*Primary Examiner* — Erez Gurari
(74) *Attorney, Agent, or Firm* — Swanson & Bratschun, L.L.C.

(57) ABSTRACT

An adjustment device for adjusting an air inlet of a motor compartment of a motor vehicle between at least a first position in which the air inlet is substantially open and a second position in which the air inlet is substantially closed, comprising a drive unit for adjusting the air inlet between at least the first position and the second position, wherein the drive unit comprises a compound drive system.

12 Claims, 6 Drawing Sheets

(56) References Cited

U.S. PATENT DOCUMENTS

| | | | |
|---|---|---|---|
| 5,732,666 A * | 3/1998 | Lee | F01P 7/026 123/41.05 |
| 6,142,108 A | 11/2000 | Blichmann | |
| 6,145,251 A | 11/2000 | Ricci | |
| 6,565,221 B2 | 5/2003 | Guttenberger et al. | |
| 7,498,926 B2 | 3/2009 | Browne | |
| 7,866,737 B2 | 1/2011 | Browne | |
| 8,161,919 B2 | 4/2012 | Klotz | |
| 8,544,581 B2 | 10/2013 | Stokes | |
| 8,689,917 B2 | 4/2014 | Miesterfeld | |
| 9,110,896 B2 | 8/2015 | Jeong | |
| 9,370,995 B2 | 1/2016 | Jeong | |
| 9,333,850 B2 | 5/2016 | Ruppert | |
| 9,365,106 B2 | 6/2016 | Bruckner | |
| 9,670,824 B2 | 6/2017 | Sowards | |
| 9,676,269 B2 | 6/2017 | Jeong | |
| 9,694,669 B2 | 7/2017 | Ruppert | |
| 9,701,191 B2 | 7/2017 | Yoshioka | |
| 9,758,031 B2 | 9/2017 | Edwards | |
| 9,840,144 B2 | 12/2017 | Aizawa | |
| 2002/0056540 A1 | 5/2002 | Mizorogi | |
| 2006/0104074 A1 | 5/2006 | Boniface et al. | |
| 2006/0202508 A1 | 9/2006 | Aase | |
| 2008/0178526 A1 | 7/2008 | Browne et al. | |
| 2009/0159823 A1 | 6/2009 | Matsunaga et al. | |
| 2010/0062895 A1 | 3/2010 | Brouwer | |
| 2011/0232981 A1* | 9/2011 | Hori | B60K 11/085 180/68.1 |
| 2011/0246023 A1 | 10/2011 | Lockwood | |
| 2012/0012410 A1 | 1/2012 | Hori | |
| 2013/0092462 A1 | 4/2013 | Chinta | |
| 2013/0255599 A1 | 10/2013 | Jentz | |
| 2013/0255604 A1 | 10/2013 | Rollinger | |

FOREIGN PATENT DOCUMENTS

| | | |
|---|---|---|
| CN | 101499695 A | 8/2009 |
| DE | 3506156 | 2/1986 |
| DE | 3438709 | 4/1986 |
| DE | 3522592 | 1/1987 |
| DE | 3701584 | 8/1988 |
| DE | 3731980 C1 | 3/1989 |
| DE | 4020953 | 1/1992 |
| DE | 10047952 | 4/2002 |
| DE | 10218700 | 11/2003 |
| DE | 10307632 | 9/2004 |
| DE | 202005 010683 | 10/2005 |
| DE | 60208158 | 8/2006 |
| DE | 102006042627 | 3/2008 |
| DE | 102007030890 | 1/2009 |
| DE | 102009014003 | 9/2010 |
| DE | 102009035362 | 2/2011 |
| EP | 2233343 | 9/2010 |
| EP | 2248693 | 11/2010 |
| EP | 2325035 | 5/2011 |
| EP | 2371602 | 10/2011 |
| FR | 2738779 | 3/1997 |
| JP | 6418744 | 1/1989 |
| JP | H02293245 A | 1/1990 |
| JP | 2010/223150 | 7/2010 |
| JP | 2011201439 A | 10/2011 |
| KR | 2019960034994 | 11/1996 |
| KR | 1001899257 B1 | 6/1999 |
| KR | 200302570 | 1/2003 |
| KR | 10-2004-0097420 | 11/2004 |
| WO | WO 2007/108803 | 9/2007 |
| WO | WO 2007/130847 | 11/2007 |
| WO | WO 2009/091246 A | 7/2009 |
| WO | WO 2012/067502 | 5/2012 |

OTHER PUBLICATIONS

DE 19719991 w/ISR from PCT/NL2013/050414, dated Nov. 19, 1998.
Office Action from U.S. Appl. No. 13/885,424 dated Jun. 18, 2015.
Office Action from U.S. Appl. No. 13/885,424 dated Nov. 12, 2014.
Office Action from U.S. Appl. No. 14/407,139 dated Sep. 28, 2015.
Office Action from CN 201280045907.9 dated Nov. 10, 2015.
International Search Report from PCT/NL2011/050766 (WO 2012/067502), dated Dec. 15, 2011.
International Search Report, from PCT/NL2012/050524 (WO 2013/012337), dated Oct. 5, 2012.
JP 1018744 w/ ISR from PCT/NL2013/050482, dated Jan. 23, 1989.
International Search Report from PCT/NL2013/050482 dated Oct. 25, 2013.
Notice of Allowance from U.S. Appl. No. 14/403,859 dated Jun. 23, 2015.
Office Action from U.S. Appl. No. 13/885,4245 dated Nov. 6, 2015.
Office Action dated Apr. 24, 2015, from Chinese App No. 2011800558421, with English Translation.
Office Action from CN 201280045907.9 dated Jul. 20, 2016.
Office Action from CN 2013800398756 dated Aug. 3, 2016.
Office Action from JP 2013-538679 dated Oct. 26, 2015.
Office Action from Korean App No. 10-2013-7013416 dated Aug. 5, 2016 with English translation.
Office Action from U.S. Appl. No. 14/413,269 dated Aug. 25, 2015.
Office Action from U.S. Appl. No. 14/407,139 dated Sep. 16, 2016.
Merkmalsgliederung des Anspruchs 1.
Notice of Opposition from EP 11782253.6 dated May 7, 2015.
Notice of Opposition from EP 11782253.6 dated Jun. 17, 2015.
Notice of Allowance from JP 2014521585 dated Sep. 4, 2017 (with English Translation).
Notice of Allowance from JP 2014521585 dated Sep. 4, 2017.
Office Action from KR 1020147003417 dated Feb. 3, 2017 (with English Translation).
Office Action from U.S. Appl. No. 14/772,318 dated Dec. 29, 2017.

* cited by examiner

ADJUSTMENT DEVICE WITH DRIVE UNIT; AIR INLET WITH SUCH AN ADJUSTMENT DEVICE; MOTOR VEHICLE WITH SUCH AN AIR INLET

RELATED APPLICATIONS

This application is a 35 U.S.C. §371 national phase application of PCT/NL2012/050524 (WO 2013/012337), filed on Jul. 20, 2012, entitled "Adjustment Device with Drive Unit; Air Inlet with Such an Adjustment Device; Motor Vehicle with Such an Air Inlet", which application claims priority to Netherlands Application No. 2007162, filed Jul. 21, 2011, which is incorporated herein by reference in its entirety.

The invention relates to an adjustment device for adjusting an air inlet of a motor compartment of a motor vehicle.

A motor vehicle is typically provided with an air inlet comprising one or more air inlet openings. An air inlet is commonly used to cool the motor of the motor vehicle during operation. Air inlets are usually located at a front of the motor vehicle in front of the motor. Usually, a motor can be cooled by means of a coolant, for example, water or oil. This coolant is cooled with air in a heat exchanger, for instance, in a radiator. The air flowing through the air inlet may be guided wholly or partly to the radiator of the motor compartment of the motor of the motor vehicle to cool the motor indirectly via the coolant. It is known to make an air inlet of a motor compartment of adjustable design, allowing the air inlet to be adjusted between an open position and a closed position. To this end, the air inlet may be provided with adjustment elements, for example, strips, which can be adjusted, for example, pivoted about an upright or lying axis.

In the closed position of the air inlet the air resistance of the vehicle is lowered, which is beneficial to the fuel consumption of the motor. Further, where the efficiency of the motor, fuel consumption and $CO_2$ emission are concerned, a motor of a motor vehicle has an optimum operating temperature, which is typically higher than the ambient temperature. A closed air inlet when the motor is cold is then once again beneficial to fuel consumption. Also, during driving with an open air inlet, the temperature of the motor can fall below the optimum operating temperature, so that fuel consumption may increase. Fuel consumption of the motor may also increase at an operating temperature above the optimum operating temperature.

It can hence be advantageous to make an air inlet opening of adjustable design. To this end, the air inlet is usually coupled with an adjustment device which comprises a drive unit. With the aid of the drive unit the air inlet can be closed and be opened. When in the case of a closed air inlet the operating temperature of the motor runs up too high, the air inlet can be opened again to provide for sufficient cooling.

Known adjustment devices, such as, for example, the adjustment device described in U.S. Pat. No. 4,926,921, usually comprise a complex drive unit. Drawbacks of such drive units are that they are relatively maintenance-prone and have a relatively short life. Also, such complex drive units are usually relatively heavy, large and sensitive to failure and/or have insufficient power.

An object of the invention is to make available an adjustment device which counteracts at least one of the above-mentioned drawbacks. To this end, the invention provides an adjustment device for adjusting an air inlet of a motor compartment of a motor vehicle between at least a first position in which the air inlet is substantially open and a second position in which the air inlet is substantially closed, comprising a drive unit for adjusting the air inlet between at least the first position and the second position, wherein the drive unit comprises a compound drive system.

By providing a drive unit comprising a compound drive system, the drive unit can be designed to be relatively compact, and hence with a relatively low overall height. As a consequence, the adjustment device can also be relatively compact, so that it can be placed at various locations near the air inlet. This can give designers greater freedom of design and greater flexibility.

By providing a compound drive system, in a relatively compact manner a relatively large transmission ratio can be achieved, allowing the adjustment device to be operated with a relatively small motor. This can also render the overall dimensions favorable.

Compound drive systems are known in different designs, for example, in the form of a compound planetary gear system, a cycloidal drive system or as a harmonic-drive drive system.

Compound drive systems usually comprise one input gear, and at least two output gears. Typically, one of the output gears is blocked and is connected with the fixed world. The non-blocked output gear is rotatable. By exchanging the blocked and non-blocked output gears, other transmission ratios and/or rotary directions can be obtained. Also, with such a drive system, a relatively high transmission ratio can be achieved in a relatively simple manner, and/or an overload protection can be applied in a relatively simple manner. A compound drive system can extend around a main axis to thus make a compact construction possible.

Compound planetary gear systems can be applied so that they comprise a compound of a driven sun gear, one or more stepped or non-stepped planet gears, and two or more output outer gears. These are known to one skilled in the art, inter alia as "Wolfrom" planetary gear systems. Also other designs, such as, for example, a driven planet gear carrier with stepped or non-stepped planets and two output outer gears, are conceivable. These and other designs are described in "Raumbedarf and Wirkungsgrad zusammengesetzter Planetenrädergetriebe", P. W. Jensen, Konstruktion 21, Heft 5 (1969).

Cycloidal drive systems usually comprise an outer gear, a planet carrier bearing-mounted concentrically with the outer gear, one or more planets, and a sun gear bearing-mounted concentrically with the outer gear. The sun gear is provided with an eccentrically placed bearing shaft for each of the planets. The outer gear may be connected with the fixed world and fulfills the function of the first output gear. The planet carrier fulfills the function of second output gear and is not blocked. Of course, the outer ring may be of non-blocked design and the planet carrier of blocked design. The planet carrier is usually provided with pins rotating in holes of the planets. The outer ring gear has a number of teeth that is greater than the number of teeth of the planet. Depending on the difference in number of teeth, a relatively high transmission ratio can be achieved. The cycloidal drive system can be of relatively compact design.

Harmonic-drive drive systems usually comprise an annular outer ring, a flexible inner ring which is connected with an output shaft, and a wave generator which is connected with an input shaft. The flexible inner ring is provided with an outer toothing which cooperates with an inner toothing of the outer ring. In the flexible inner ring rotates the wave generator, such that a limited number of teeth of the flexible inner ring mesh with the annular outer ring. Through the rotary movement of the wave generator and due to the outer ring having more teeth than the inner ring, the inner ring will move relative to the outer ring. Depending on which ring is connected with the fixed world, a relatively high transmission ratio can be achieved. Other embodiments, such as, for example, an embodiment with two outer rings and a flexible inner ring rotation-locked with the fixed world, are also possible.

Advantageously, the drive unit has a side axis which extends at a distance from and substantially parallel to the main axis of the drive system. This allows the overall height of the adjustment device to be made still more compact. The drive unit is advantageously provided with a first shaft and a second shaft. The first shaft and the second shaft are at a mutual distance and are substantially parallel to each other. The drive system can substantially extend around the first shaft, with the main axis of the drive system coinciding with the first shaft. The drive system can substantially extend around the second shaft, with the main axis of the drive system coinciding with the second shaft. This gives a designer relatively great freedom of design. Depending on the situation, one configuration or the other configuration can be chosen.

By providing an input gear having an eccentric output, the drive system may possibly be made of still more compact design. Thus, it may suffice, for example, to provide just one planet gear which can be coupled with a drive wheel or output gear.

Advantageously, one output gear of the compound drive system is detachably connected with a fixed world. This can be advantageous, for example, when a fail-safe functionality is added to the drive unit. With such an, optional, fail-safe functionality, the adjustment device, in the event of a calamity, could be brought in one go to the opened position or closed position or a predetermined intermediate position. For example, the output gear which is detachably connected with the fixed world, for example, a ring gear in a compound planetary gear system, may be biased under the influence of an energy storage element. By detachably connecting the output gear with the fixed world, for example, with a housing of the adjustment device, a fail-safe device, if any, can be coupled with the drive unit in a simple manner.

The energy storage element may be designed as a spring, but may also comprise a capacitor element, or a battery or a coil element in which electrical and/or electromagnetic energy can be stored. Also, the energy storage element can comprise, for example, a memory metal and/or a bimetal element and/or a pyrotechnic element. Diverse energy storage elements can be possible. An energy storage element may be arranged for storing, for example, kinetic energy, electrical energy, electromagnetic energy, potential energy, thermal energy, chemical energy, etc.

Calamity may be understood to mean a failure in the drive unit of the adjustment device and/or a circumstance in the motor vehicle or outside it which may make it desirable to open or close the air inlet quickly, for instance, in case of fire in the motor compartment, or in case of an increased concentration of sand or dust in the ambient air.

Advantageously, the adjustment device may be provided with a position determiner for directly and/or indirectly determining a position of adjustment elements of the air inlet.

Further advantageous embodiments are represented in the dependent claims.

The invention further relates to an air inlet provided with such an adjustment device, and to a motor vehicle provided with such an air inlet.

The invention will be elucidated in more detail on the basis of exemplary embodiments of an adjustment device which are shown in a drawing. In the drawing:

FIG. 4 shows a schematic representation of a drive unit of the exemplary embodiment of FIG. 3 and FIG. 3a;

In the Figures, the same or corresponding parts are identified with the same reference numerals. It is noted that the Figures are merely shown by way of exemplary embodiment and should not in any way be construed as limiting.

Figure 1:
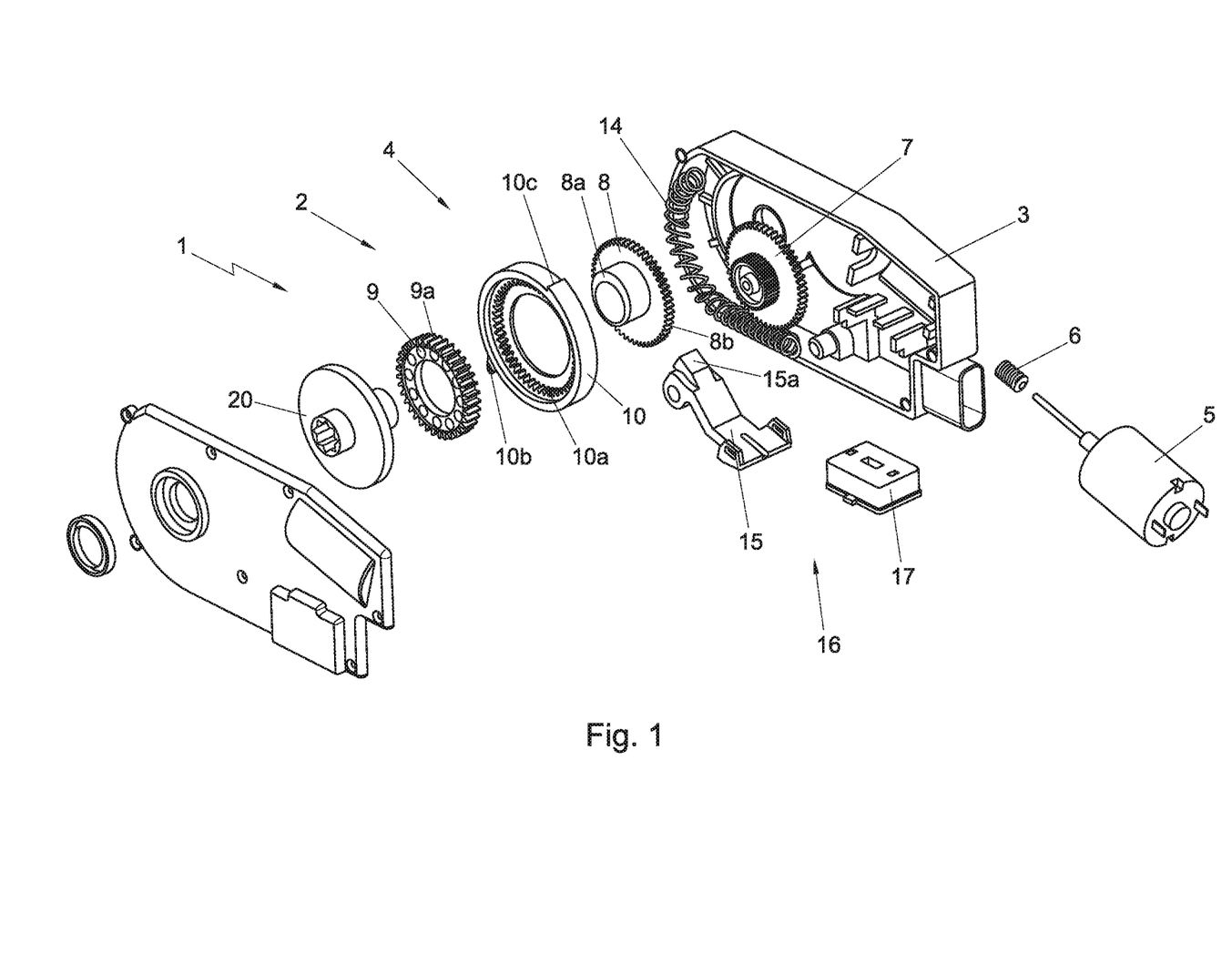
FIG. 1 shows a perspective exploded view of a first embodiment of an adjustment device according to the invention.

FIG. 1 shows a perspective exploded view of an adjustment device 1 according to the invention. The adjustment device 1 is arranged for adjusting an air inlet of a motor compartment of a motor vehicle. The air inlet can be adjusted between at least a first position in which the air inlet is substantially open and a second position in which the air inlet is substantially closed.

The adjustment device comprises a drive unit 2 for adjusting the air inlet between at least the first position and the second position. The drive unit 2 is here included in a housing 3.

According to the invention, the drive unit 2 comprises a compound drive system 4, here a compound planetary gear system 4, owing to which the drive unit 2 can be relatively compact and can have a relatively high transmission ratio.

In the housing 3 is a motor 5 which drives the planetary gear system 4 via a worm wheel 6 and a side gear 7.

Advantageously, the motor 5 is an electrical actuator which can be connected with a power circuit of the motor vehicle. Other implementations of the motor 5 are also possible.

The side gear 7 drives a sun gear 8 as input gear of the planetary gear system 4. The sun gear 8 is here designed with an eccentric output 8a, so that in this exemplary embodiment use can be made of just one planet gear 9. In other embodiments, several planet gears 9 may be provided.

The planet gear 9 has an external toothing 9a which meshes with an internal toothing 10a of a ring gear 10. Due to the eccentric output 8a of the sun gear 8 and due to the planet gear 9 having a smaller number of teeth than the toothing 10a of the ring gear 10, the planet gear 9 revolves in the ring gear 10 while meshing with a limited number of teeth. The external toothing 9a of the planet gear 9 also meshes with an internal toothing 11a of the drive wheel 11. Drive wheel 11 and ring gear 10 are bearing mounted concentrically.

The two output gears of the compound drive system 4 are here designed as ring gear 10 and drive wheel 11. The ring gear 10 is connected with the fixed world, the drive wheel 11 is rotatable. In this exemplary embodiment the ring gear 10 is detachably connected with the housing 3, as is elucidated hereinafter.

The drive wheel 11 constitutes the output of the adjustment device 1 with which the air inlet can be adjusted. The difference in tooth number of the internal toothing 10a of the ring gear 10 and the internal toothing 11a of the drive wheel 11 is small and preferably one. This leads, with blocking of one of the output gearwheels, ring gear 10 or drive wheel 11, and upon drive of the sun gear 8, to rotation of the other, non-blocked output gearwheel.

The sun gear 8 is provided with at least one output, with each output coupled with a planet gear. In this exemplary embodiment, the sun gear is provided with one output, the eccentric output 8a. However, the sun gear may also be provided with, for example, two outputs which are each coupled with a planet gear. By providing two planet gears, the force can be relatively favorably distributed over the drive system. Many variants are possible.

Figure 2:
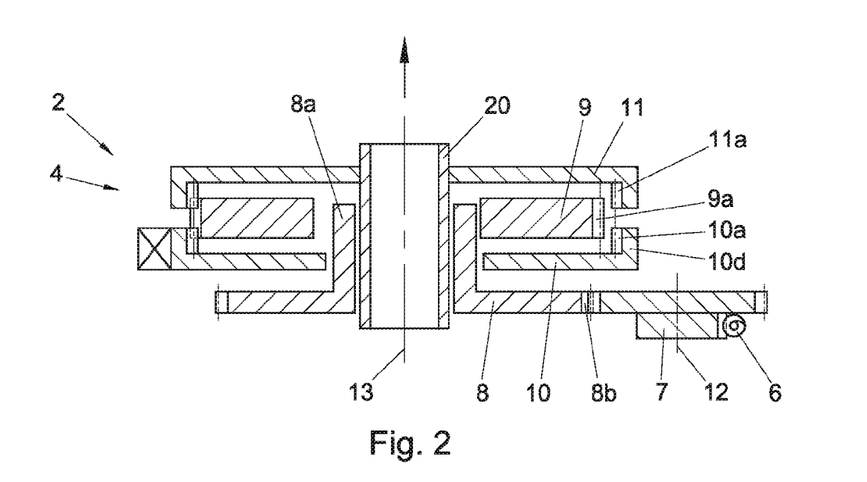
FIG. 2 shows a schematic representation of a drive unit of the exemplary embodiment of FIG. 1.

The drive system, here the planetary gear system 4, extends substantially around the main axis 13, as shown in FIG. 2. The side gear 7 extends around the side axis 12. The main axis 13 and the side axis 12 are at a mutual distance and are substantially parallel to each other. Also extending around the main axis 13 is a drive shaft 20 of the adjustment device 1. The drive shaft 20 is here an output of the drive wheel 11.

As a consequence, the overall height of the drive unit 2 can be relatively small. The side axis 12 can be regarded as the first shaft of the drive unit 2, which is the first to be driven by the motor 5. The main axis 13 can be regarded as the second shaft of the drive unit 2, which is driven by the motor 5 after the first shaft.

In the exemplary embodiment shown in FIG. 1 and FIG. 2, the ring gear 10 is detachably connected with a fixed world, in this case with the housing 3 of the adjustment device 1, via a spring 14 and a lever 15. In operation, the ring gear 10 is biased against the force of an energy storage element, here the spring 14, to a fail-safe position here corresponding to the first position of the air inlet. However, the fail-safe position may also correspond to the second position or to a predetermined intermediate position located between the first and the second position.

The position of the biased ring gear 10 is here fixed in that a cam 10c on an outer side of the ring gear 10 cooperates with a cam 15a of the lever 15. The spring 14 is connected on one side with a cam (not shown) of the housing 3 and connected on the other side with a cam 10b of the ring gear 10 and extends substantially along an outer side of the ring gear 10.

Owing to the detachable connection of the ring gear 10 with the housing 3, in a simple manner a fail-safe construction 16 can be coupled with the planetary gear system 4. The fail-safe construction 16 here comprises the lever 15, a magnetic element 17 as activation element, and the spring 14 as energy storage element. Other implementations of an energy storage element are possible.

Owing to the detachable connection of the ring gear 10 with the housing 3, for example a fail-safe construction may or may not be provided, as desired. The drive unit can thus be of modular design.

The lever 15 in operation is coupled by means of magnetic force with the magnetic element 17, for example, an electrical magnet. In the event of a calamity, for example, power failure, the magnetic force of the magnetic element 17 will decrease, so that the coupling with the lever 15 is undone. As a result, the lever 15 will make a pivotal movement resulting from the force of the spring 14, so that a cam 15a uncouples from a cam 10b on an outer side of the ring gear 10, and the ring gear 10 will move under the influence of the spring force to an end position, here corresponding to the first position of the air inlet. As a result, the air inlet will substantially open. It will be clear to one skilled in the art that in the case of a similar but mirrored construction of ring gear 10, spring 14 and lever 15, in the event of a calamity, for example, fire in the motor compartment, the air inlet will substantially close.

The magnetic element 17 here functions as activation element for activating a fail-safe mode and uncoupling the energy storage element. The activation element may be implemented in diverse manners, for example, as a thermocouple, a temperature sensor, a signal of the motor management, a spring, a bimetal element, a nitinol element, a $CO_2$ alarm, etc.

Such a fail-safe construction 16 is reusable. When putting the adjustment device 1 into use again, the ring gear 10, under the influence of the drive of motor 5, will be tensioned against the force of the spring 14 towards the end position until cam 10b couples with the cam 15a of the lever 15.

Figure 3:
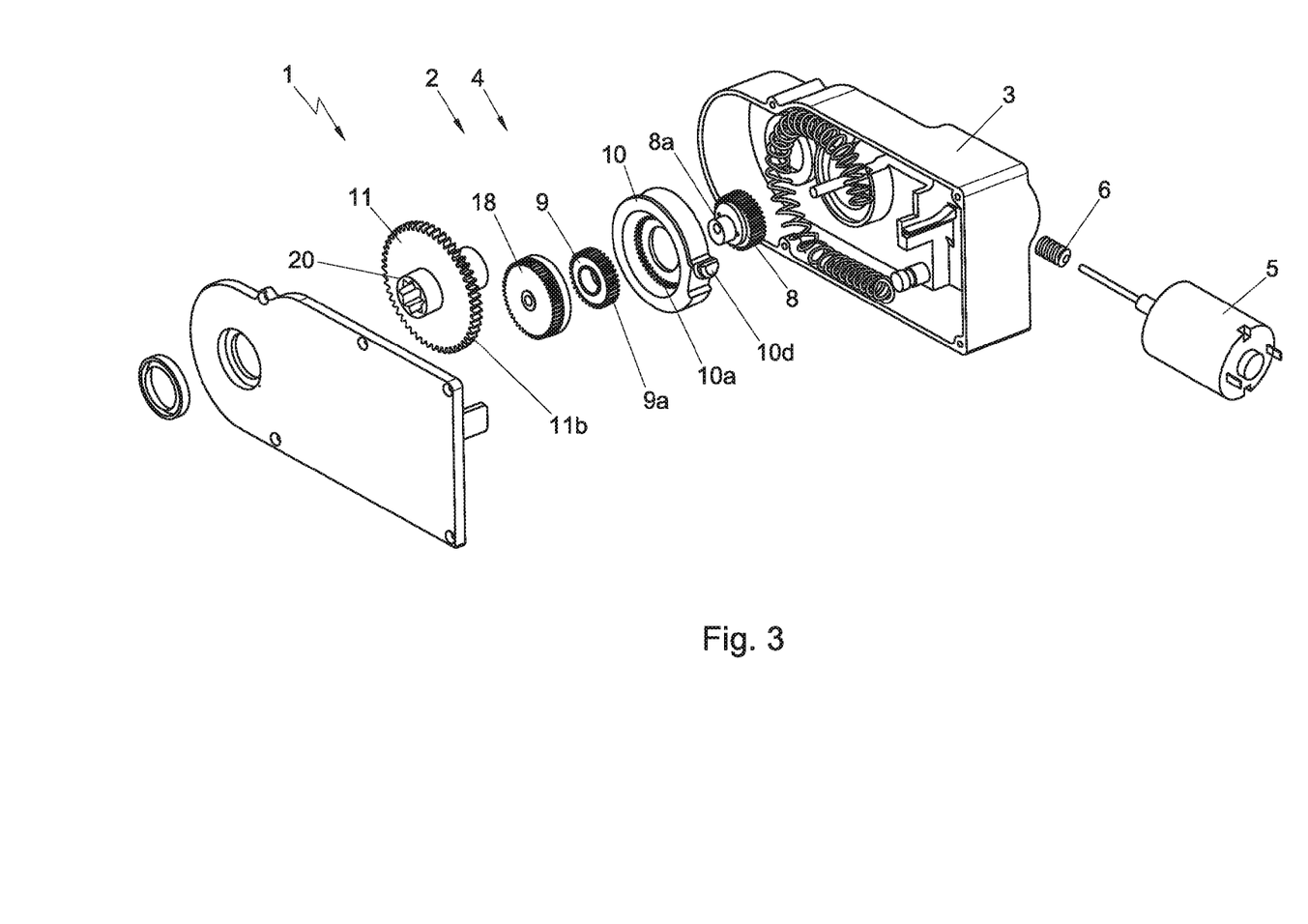
FIG. 3 is a perspective exploded view of a second embodiment of an adjustment device according to the invention.
Figure 3A:
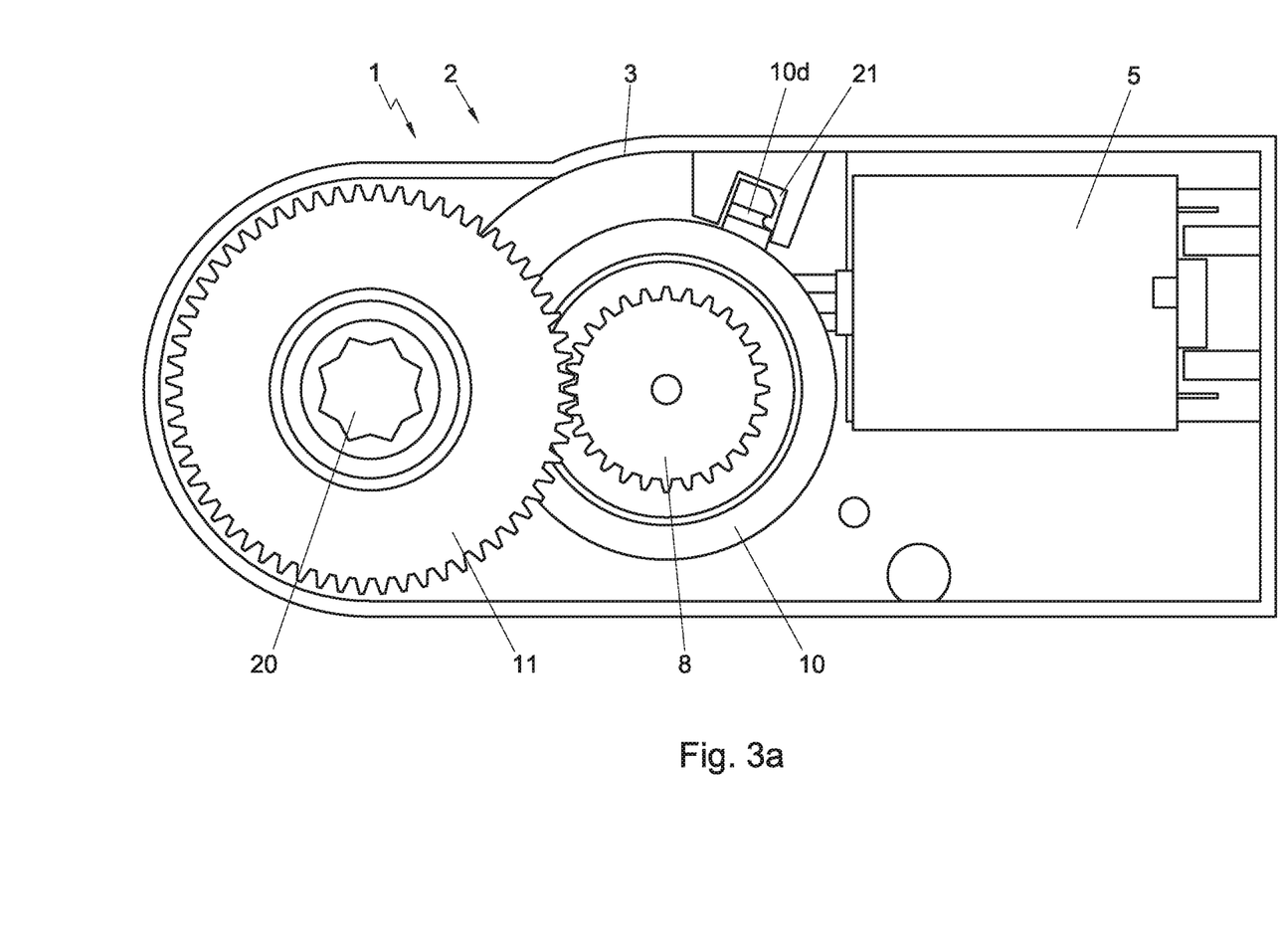
FIG. 3a is a schematic top plan view of the second embodiment of an adjustment device according to the invention.
Figure 4:
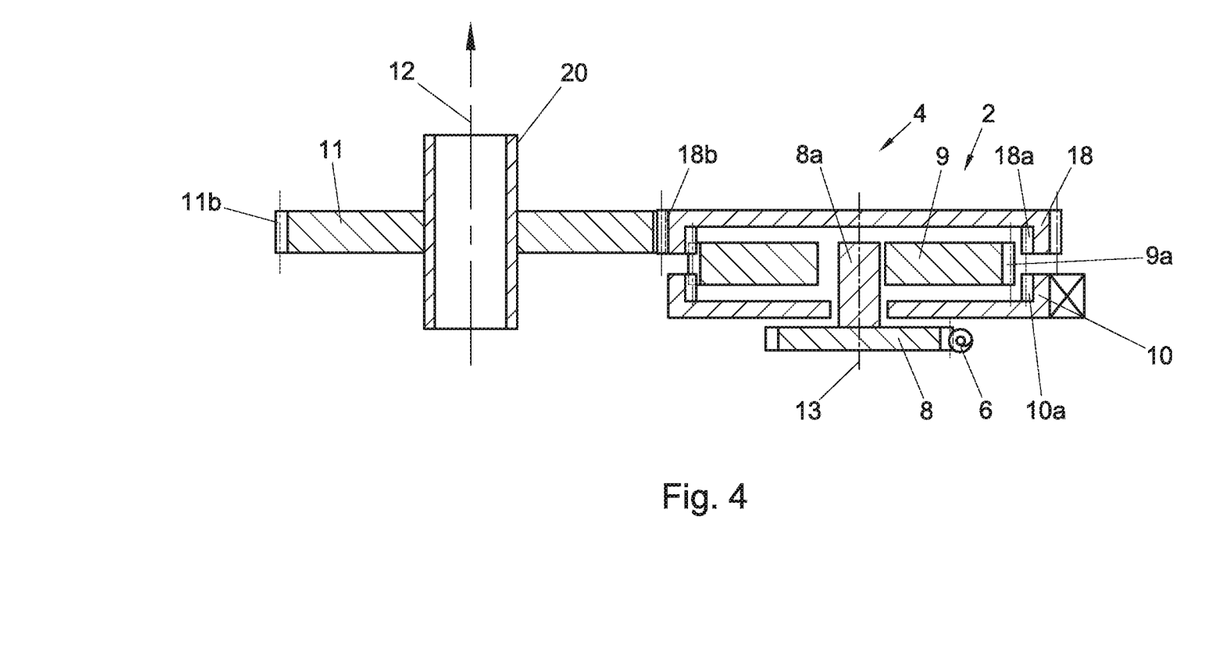

FIG. 3, FIG. 3a, and FIG. 4 show a second embodiment of an adjustment device 1 according to the invention. In this second embodiment, the planetary gear system 4 is oriented substantially around the main axis 13. The motor 5 drives the sun gear 8 via a worm wheel 6. The sun gear 8, as input gear of the drive system, has an eccentric output 8a around which moves a planet 9. The planet 9 moves in the ring gear 10, as an output gear. The external toothing 9a has a smaller number of teeth than the internal toothing 10a, so that in each case only a limited number of teeth of the planet gear 9 are in mesh with the ring gear 10. Around the planet gear 9 engages an intermediate gear 18, as an output gear. The intermediate gear 18 has an internal toothing 18a in mesh with the external toothing 9a of the planet gear 9. The intermediate gear 18 further has an external toothing 18b in mesh with an external toothing 11b of the drive wheel 11. The ring gear 10 as output gear is blocked and fixedly connected with the housing 3 as fixed world. The intermediate gear 18, as output gear, is not blocked and is rotatable.

As is shown in FIG. 4, the planetary gear system 4 is situated substantially around the main axis 13. The main axis 13 here forms the first shaft of the drive unit. The drive wheel 11 extends around the side axis 12 as second shaft of the drive unit 2. As a result, a relatively flat and compact drive unit can be achieved. The drive wheel 11 comprises the drive shaft 20 as output of the adjustment device 1 for adjusting the air inlet.

The embodiment of FIG. 4 and FIG. 3, FIG. 3a is here not provided with a fail-safe construction, but this could be added, if desired. In this exemplary embodiment, the ring gear 10 is fixedly connected with the housing 3 as fixed world. A cam 10d on the outer side of the ring gear 10 is here fixedly locked in a recess 21 of the housing 3. Possibly, the ring gear 10 can also be integral with the housing 3.

Figure 5:
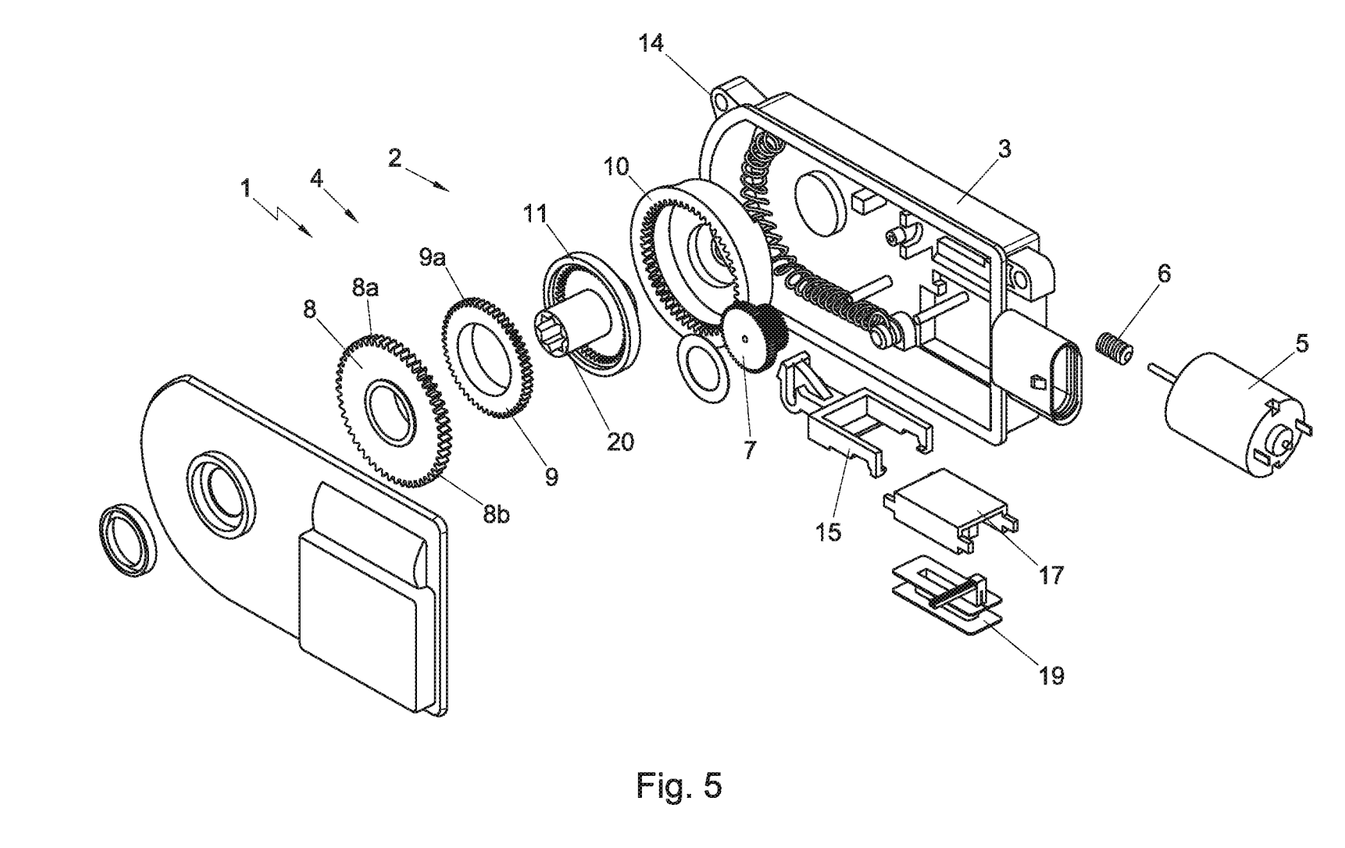
FIG. 5 shows a perspective exploded view of a third embodiment of an adjustment device according to the invention.
Figure 6:
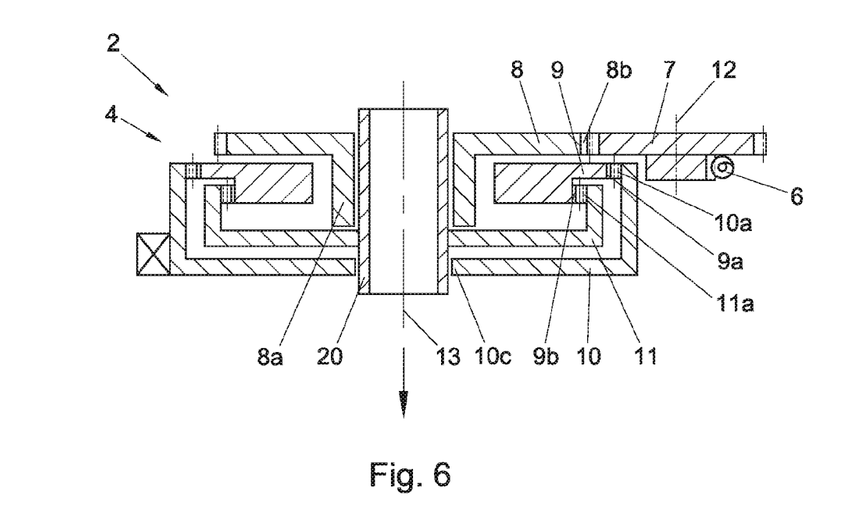
FIG. 6 shows a schematic representation of a drive unit of the exemplary embodiment of FIG. 5.

FIG. 5 and FIG. 6 show a third exemplary embodiment of an adjustment device 1 according to the invention. A motor 5 drives a side gear 7 via the worm wheel 6. The side gear 7 couples with the external toothing 8b of the sun gear 8. The sun gear 8 is provided with an eccentric output 8a around which a planet gear 9 moves.

The planet gear 9 moves in the ring gear 10. The external toothing 9a meshes in part with the internal toothing 10a of the ring gear 10, since the external toothing 9a comprises fewer teeth than the internal toothing 10a. The planet gear 9 in turn is coupled with the drive wheel 11. The planet gear 9 is here a stepped planet gear with a first external toothing 9a which cooperates with the internal toothing 10a of the ring gear 10 and a second external toothing 9b which cooperates with the internal toothing 11a of the drive wheel 11.

The ring gear 10, as output gear of the drive system 4, is of blocked design; here, the ring gear 10 is detachably connected with the housing 3. The drive wheel 11, as output gear of the drive system 4, is not of blocked design, but of rotatable design. The drive wheel 11 comprises the drive shaft 20 of the adjustment device 1 for adjusting the air inlet.

As can be seen in FIG. 6, the planetary gear system 4 is situated substantially around the main axis 13 which in this exemplary embodiment coincides with the second shaft of the drive unit 2. The side gear 7 is situated around the side axis 12 which coincides with the first shaft of the drive unit 2.

In FIG. 5, further a fail-safe construction is shown, comprising a lever 15, an activation element 17 designed as a magnetic element, and an energy storage element 14 designed as a spring. In case of a calamity, the magnetic element 17 will activate the energy storage element 14 via the lever 15. For instance, in case of a calamity, the magnetic coupling between the magnetic element 17 and a counter element 19 can be broken, so that the lever 15 pivots and the ring gear 10 is uncoupled. The ring gear 10 then moves under the influence of the spring force 14 from a biased position to a fail-safe position. The fail-safe position of the ring gear 10 corresponds substantially to the second position of the air inlet in which it is substantially closed, but might also correspond to the first position of the air inlet in which it is open, or to a predetermined intermediate position in which it is partly open. Similarly to the fail-safe construction shown in FIG. 1, the fail-safe construction shown in FIG. 5 is reusable. After a calamity, the ring gear 10, as a result of the motor 5 being put into operation, can be biased again towards the initial position or any intermediate position. For this, for example, use can be made of a Hall sensor, whereby, for example, a number of revolutions may be counted. In this exemplary embodiment, too, the fail-safe construction can be omitted, if desired.

Advantageously, the ring gear 10, as shown in FIG. 6, is bearing-mounted on an inner side 10c near a drive shaft 20 of the drive wheel 11. The sun gear 8 is also bearing-mounted near the drive shaft 20, so that near the drive shaft 20 a favorable force ratio is obtained. In the exemplary embodiment shown in FIG. 2, the ring gear 10 is bearing-mounted on an outer side 10d.

The adjustment device 1 may further be provided with a position determiner for directly or indirectly determining the position of the adjustment elements of the air inlet. The adjustment elements of the air inlet can be, for example, pivotable strips. The position of such adjustment elements can be determined indirectly, for example, by counting, for example, the number of revolutions of the motor or of a gearwheel. For example, elements of the drive system may be provided with a potentiometer or Hall sensor or an electret sensor or an optical sensor. Many variants of sensors are possible.

The position determiner may also determine the position of the adjustment elements directly, for example, by measuring the angle of the adjustment elements or by counting the adjustment steps. For this, too, many variants are possible. Advantageously, a position determiner may be provided with a memory function to remember and/or reproduce different positions. For example, the memory function may be utilized after the fail-safe construction has entered into operation as a result of a calamity, to return to a pre-set position and/or to a position occupied last.

The invention is not limited to the exemplary embodiments represented here. The adjustment device has been described hereinabove on the basis of a planetary gear system as compound drive system, but the drive system may also be designed as a cycloidal drive system or a harmonic-drive drive system. Many variants are possible and will be clear to one skilled in the art. Such variants are understood to fall within the scope of the appended claims.

The invention claimed is:

1. An adjustment device for adjusting an air inlet of a motor compartment of a motor vehicle between at least a first position in which the air inlet is substantially open and a second position in which the air inlet is substantially closed, comprising a drive unit for adjusting the air inlet between at least the first position and the second position, wherein the drive unit comprises a compound drive system, wherein the compound drive system comprises an input gear and at least two output gears which extend substantially around a main axis, wherein at least one of the output gears is detachably connected with the housing comprising the drive unit, and wherein the output gear detachably connected with the housing comprising the drive unit is under a bias of an energy storage element.

2. The adjustment device according to claim 1, wherein the drive unit furthermore comprises a side axis which extends at a distance from and substantially parallel to the main axis.

3. The adjustment device according to claim 1, wherein the drive unit is provided with a first shaft and a second shaft at a distance therefrom and substantially parallel thereto, wherein the drive system substantially extends along at least one of the first shaft and the second shaft.

4. The adjustment device according to claim 1, wherein the input gear has an eccentric output.

5. The adjustment device according to claim 1, wherein the compound drive system is formed by a harmonic drive system.

6. The adjustment device according to claim 1, wherein the compound drive system is formed by a cycloidal drive system.

7. The adjustment device according to claim 1, furthermore comprising a position determiner.

8. An air inlet provided with an adjustment device according to claim 1.

9. A motor vehicle provided with an air inlet with an adjustment device according to claim 1.

10. An adjustment device for adjusting an air inlet of a motor compartment of a motor vehicle between at least a first position in which the air inlet is substantially open and a second position in which the air inlet is substantially closed, comprising a drive unit for adjusting the air inlet between at least the first position and the second position, wherein the drive unit comprises a compound drive system, and wherein the compound drive system comprises an input gear and at least two output gears which extend substantially around a main axis, wherein the compound drive system is formed by a planetary gear system, and wherein a ring gear forms an output gear detachably or non-detachably connected with a housing comprising the drive unit.

11. The adjustment device according to claim 10, wherein a side gear situated on a side axis drives a sun gear located on the main axis.

12. An adjustment device for adjusting an air inlet of a motor compartment of a motor vehicle between at least a first position in which the air inlet is substantially open and a second position in which the air inlet is substantially closed, comprising a drive unit for adjusting the air inlet between at least the first position and the second position, wherein the drive unit comprises a compound drive system, and wherein the compound drive system comprises an input gear and at least two output gears which extend substantially around a main axis, wherein the compound drive system is formed by at least two of a harmonic drive system, a cycloidal drive system or a compound planetary gear system.

* * * * *